(12) United States Patent
Min et al.

(10) Patent No.: US 11,090,722 B2
(45) Date of Patent: Aug. 17, 2021

(54) METHOD FOR PREPARING NICKEL NANOPOWDERS AND METHOD FOR MAKING NICKEL NANOPOWDERS INTO PASTE

(71) Applicant: SOLUETA CO., LTD., Ansan-si (KR)

(72) Inventors: Eui-Hong Min, Seongnam-si (KR); Sang-Ho Cho, Hwaseong-si (KR); Buck-Keun Choi, Hwaseong-si (KR)

(73) Assignee: SOLUETA CO., LTD., Ansan-si (KR)

( * ) Notice: Subject to any disclaimer, the term of this patent is extended or adjusted under 35 U.S.C. 154(b) by 53 days.

(21) Appl. No.: 16/608,951

(22) PCT Filed: Apr. 27, 2018

(86) PCT No.: PCT/KR2018/004904
§ 371 (c)(1),
(2) Date: Oct. 28, 2019

(87) PCT Pub. No.: WO2018/199679
PCT Pub. Date: Nov. 1, 2018

(65) Prior Publication Data
US 2020/0189004 A1 Jun. 18, 2020

(30) Foreign Application Priority Data
Apr. 28, 2017 (KR) .................. 10-2017-0055185

(51) Int. Cl.
*B22F 9/20* (2006.01)
*B22F 1/00* (2006.01)
*H01G 4/008* (2006.01)

(52) U.S. Cl.
CPC .............. *B22F 9/20* (2013.01); *B22F 1/0059* (2013.01); *B22F 2301/15* (2013.01); *H01G 4/008* (2013.01)

(58) Field of Classification Search
CPC ....................................................... B22F 9/20
See application file for complete search history.

(56) References Cited

U.S. PATENT DOCUMENTS

| 6,592,645 | B1 * | 7/2003 | Mizutani | ............... | H01G 4/008 75/365 |
| 2007/0101822 | A1 * | 5/2007 | Hattori | ................. | B22F 1/0018 75/255 |
| 2012/0219787 | A1 | 8/2012 | Jun et al. | | |

FOREIGN PATENT DOCUMENTS

| JP | 2008-261054 A | 10/2008 |
| JP | 2012-182111 A | 9/2012 |

(Continued)

OTHER PUBLICATIONS

Lee et al, KR 10-2004-0072991, machine translation (Year: 2004).*
International Search Report for PCT/KR2018/004904 dated, Aug. 20, 2018 (PCT/ISA/210).

*Primary Examiner* — William D Young
(74) *Attorney, Agent, or Firm* — Sughrue Mion, PLLC

(57) ABSTRACT

Provided is a method for making nickel nanopowders into paste including: (a) preparing a nickel oxide configured in the form of an oxide; (b) preparing nano-sized nickel oxide nanopowders by pulverizing the nickel oxide; (c) a step of drying the nickel oxide nanopowders; (d) a step of preparing natural metal nickel nanopowders by preparing the nickel oxide nanopowders as the natural metal nickel nanopowders through a reduction process in a hydrogen atmosphere and heat-treating the same at the same time; (e) a step of simultaneously performing a step of crushing the natural metal nickel nanopowders prepared by the heat treatment and a nanopowder oxidation preventing coating step of forming an oxidation preventing film on the natural metal nickel nanopowders with an additive; and (f) a step of making the natural metal nickel nanopowders, which have (Continued)

been simultaneously subjected to the crushing and coating steps, into paste.

6 Claims, 4 Drawing Sheets

(56) References Cited

FOREIGN PATENT DOCUMENTS

| | | | |
|---|---|---|---|
| JP | 2014-162967 | A | 9/2014 |
| KR | 10-2004-0072991 | A | 8/2004 |
| KR | 10-1116192 | B1 | 2/2012 |

* cited by examiner

NiO reduced at H$_2$ atmosphere (heating rate 10°C/min)

METHOD FOR PREPARING NICKEL NANOPOWDERS AND METHOD FOR MAKING NICKEL NANOPOWDERS INTO PASTE

CROSS REFERENCE TO RELATED APPLICATIONS

This application is a National Stage of International Application No. PCT/KR2018/004904 filed Apr. 27, 2018, claiming priority based on Korean Patent Application No. 10-2017-0055185, filed Apr. 28, 2017, the entire disclosures of which are incorporated herein by reference.

TECHNICAL FIELD

The present invention relates to a method for making nickel nanopowders into a paste, and more specifically, to a method for making nickel nanopowders for the MLCC into the paste by nanopowdering nickel used in a multilayer ceramic capacitor (MLCC), crushing the nanopowdered nickel to obtain a crushed nickel nanopowder, and making the crushed nickel nanopowder into the paste.

BACKGROUND ART

A nickel powder for electronic materials is mainly used in materials for MLCC electrode, etc.

Hereinafter, a cross-section of a general MLCC will be briefly described.

The MLCC includes a dielectric and an electrode which are alternately stacked, and the MLCC has a terminal electrode made of copper or the like formed in both end portions thereof. The electrode is formed such that one end portion of the electrode is connected to the terminal electrode while the other end portion of the electrode is not connected to the terminal electrode.

The dielectric is formed to a thickness of about 6 μm, and the electrode is formed to a thickness of 1 μm or less.

In this case, a nickel powder is mainly used as an electrode material.

Conventionally, a nickel powder for forming such an MLCC electrode has been prepared from an aqueous solution of a nickel salt by a liquid reducing process.

However, the nickel powder prepared by the liquid reducing process has a problem that it is difficult to apply the nickel powder as electronic materials such as the MLCC electrode since the nickel powder is severely aggregated, and it is difficult to control shape and size of the nickel powder.

Meanwhile, local manufacturing has been essentially demanded since a large proportion of the nickel powder for forming the MLCC electrode has been imported from foreign countries, and there has been a problem of preparing a nickel oxide nanopowder since an exact preparation process has not been developed from a process of preparing nickel oxides in the form of an oxide and up to a process of crushing the nickel oxides.

Further, a specific and exact method which is capable of providing easiness in storage and transport by making a nickel oxide nanopowder into a paste has not been disclosed.

DISCLOSURE

Technical Problem

Due to the foregoing conventional problem, a large proportion of the nickel powder has been imported from foreign countries. Therefore, local manufacturing of the nickel powder is urgently required. The purpose of the present invention is to provide a method for preparing a nickel nanopowder for MLCC and an exact preparation process from a process of preparing nickel oxides in the form of an oxide and crushing the nickel oxides and up to a process of making the crushed nickel oxides into a paste.

Technical Solution

A method for making a nickel nanopowder into a paste is introduced.

To this end, a method for making a nickel nanopowder into a paste according to the present invention includes (a) a step of preparing a nickel oxide configured in the form of an oxide, (b) a nickel oxide nanopowder preparation step of pulverizing the nickel oxide to prepare a nano-sized nickel oxide nanopowder, (c) a step of drying the nickel oxide nanopowder, (d) a step of preparing the nickel oxide nanopowder into a natural metal nickel nanopowder by a reduction process in a hydrogen atmosphere and heat-treating the nickel oxide nanopowder at the same time to prepare a natural metal nickel nanopowder, (e) a step of simultaneously performing a step of crushing the natural metal nickel nanopowder produced by the heat-treatment process and a nanopowder oxidation preventing coating step of forming an oxidation preventing film on the crushed natural metal nickel nanopowder with an additive, and (f) a step of making the natural metal nickel nanopowder which has been formed by simultaneously performing the crushing step and the coating step into a paste.

Advantageous Effects

A method for making a nickel nanopowder into a paste, i.e., the present invention included of the foregoing method can improve dispersibility and yield of nickel powder, enables the prepared nickel powder to be suitably used as an electrode material for MLCC, etc., and provides easiness in storage and transport by providing the process of pasting the nickel powder.

MODE OF THE INVENTION

Hereinafter, preferred embodiments of a method for making a nickel nanopowder into a paste according to the present invention will be described with reference to the accompanying drawings.

Figure 1:
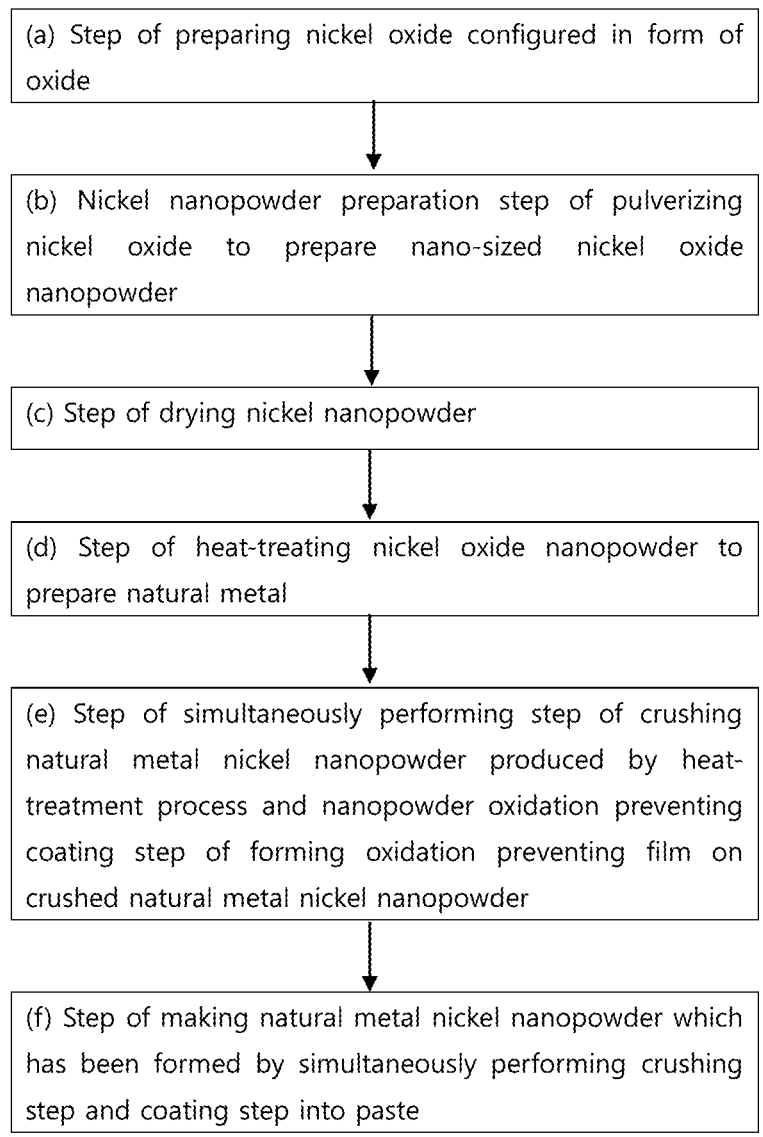
FIG. 1 is an overall flowchart illustrating a method for making a nickel nanopowder into a paste according to the present invention.

FIG. 1 is an overall flowchart illustrating a method for making a nickel nanopowder into a paste according to the present invention.

As illustrated in FIG. 1, a method for making a nickel nanopowder into a paste according to the present invention includes (a) a step of preparing a nickel oxide configured in the form of an oxide, (b) a nickel nanopowder preparation step of pulverizing the nickel oxide to prepare a nano-sized nickel oxide nanopowder, (c) a step of drying the nickel nanopowder, (d) a step of heat-treating the nickel oxide nanopowder in a hydrogen atmosphere to prepare a natural metal, (e) a step of simultaneously performing a step of crushing the natural metal nickel nanopowder produced by the heat-treatment process and a nanopowder oxidation preventing coating step of forming an oxidation preventing film on the crushed natural metal nickel nanopowder, and (f) a step of making the natural metal nickel nanopowder which has been formed by simultaneously performing the crushing step and the coating step into a paste.

As widely known in the art, nickel increases elastic modulus and electrical resistance, and a melting temperature section of nickel moves to high temperatures as an Ni content increases.

According to a conventional technique of pulverizing the nickel to prepare a nano-sized nickel, a powder-type nickel has conventionally been prepared by pulverizing metal such as nickel by plasma. However, it has been difficult to prepare the metal such as nickel into a nano-sized powder since the process not only is very costly, but also allows pulverized powder to be recombined with each other between metals.

In order to solve such a problem, the present invention does not include pulverizing metal itself, but includes forming the metal into the form of an oxide to obtain a metal oxide, and pulverizing the metal oxide such that the metal oxide can be pulverized to a nano-size by preventing pulverized oxides from being combined with each other again.

Namely, since a metal oxide of NiO is an oxide, the metal oxide of NiO is not agglomerated again, and can be pulverized into a nano-sized powder although the metal oxide of NiO is pulverized by a physical pulverizing device without using plasma.

In the present invention, the nickel oxide is physically milled by a rotating mill using a pulverizing medium to prepare a nano-sized nickel oxide nanopowder.

Examples of the rotating mill may include a bead mill, and may additionally include ball mills such as a circulating bead mill, a circulating SC mill, a tilting ATT mill, a basket mill.

Herein, the pulverizing medium preferably includes beads with a diameter of 0.3 to 3.0 mm. Further, the nickel oxide nanopowder can be prepared by using methanol or ethanol as a solvent and pulverizing the nickel oxide at a rotation speed of 1,000 to 4,000 rpm for 10 to 30 hours in the nickel oxide nanopowder preparation step.

As results that the present applicant has repeatedly performed a testing operation several times, the most preferable pulverizing medium size range is suggested. It is difficult to physically pulverize the nickel oxide when the pulverizing medium is formed to a diameter of less than 0.3 mm, while there is a problem that it is hard to prepare the nickel oxide nanopowder as it is difficult to pulverize the nickel oxide to a nano-size when the pulverizing medium is formed to a diameter of more than 3.0 mm.

Further, it is more preferable that the nickel oxide is also pulverized at a mixing ratio of NiO to methanol or ethanol of 1:5 since pulverization efficiency is lowered when the mixing ratio exceeds or falls behind the mixing ratio value.

On the other hand, beads used in pulverization are formed of at least one material selected from SUS (stainless steel), Zr, carbon steel, and steel.

When a nickel oxide nanopowder preparation step of pulverizing the nickel oxide to prepare a nano-sized nickel oxide nanopowder is performed as described above, a process of drying the solvent is required since the solvent is coated on the nickel oxide nanopowder.

Since naturally drying the solvent coated on the nickel oxide nanopowder is very time consuming, the solvent coated on the nickel oxide nanopowder is dried in a chamber-type dryer, preferably within a temperature range of 50 to 70° C. to volatilize the solvent coated on the nickel oxide nanopowder in the present invention in order to increase process efficiency.

After drying the nickel oxide nanopowder as described above, a step of heat-treating a dried nickel oxide nanopowder to prepare a natural metal nickel nanopowder is performed.

Figure 2:
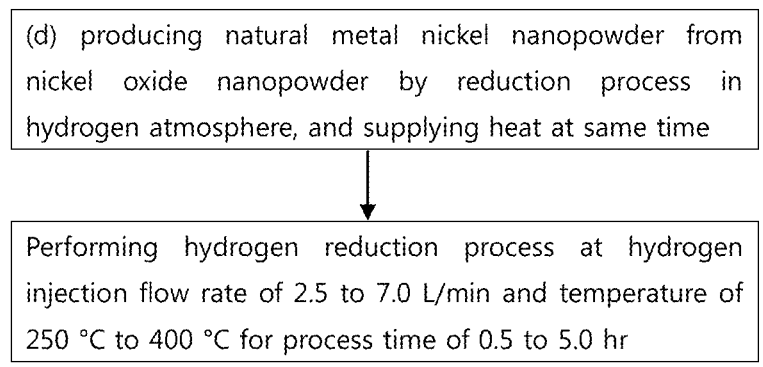
FIG. 2 is a view illustrating the step of heat-treating a nickel oxide nanopowder in a hydrogen atmosphere.

Namely, as illustrated in FIG. 2, a natural metal preparation step of preparing a natural metal nickel nanopowder from the dried nickel oxide nanopowder by a reduction process in a hydrogen atmosphere is performed, and heat is simultaneously supplied in the process by an external heat supply source such as an electric heater.

This process is progressed in a general reduction furnace, and an example of hydrogen reduction is implemented by the following expression.

When the nickel oxide nanopowder and hydrogen are injected into the reduction furnace by the foregoing hydrogen reduction process, and heat is supplied by the heat supply source including a general electric heater, etc., the natural metal nickel nanopowder can be prepared.

There is an advantage that energy can be decreased in an actually 80% temperature range since temperature of converting into a liquid phase can be lowered (i.e., energy band gap is lowered) when using the above-mentioned nanopowder having nano-sized particles in an electrode material of MLCC by a later process.

The hydrogen reduction process includes applying heat while injecting hydrogen, and preferably includes applying heat while injecting hydrogen at a flow rate of 2.5 to 7.0 L/min in a process time range of 0.5 to 5.0 hr. At this time, the hydrogen reduction process is preferably performed at a temperature of the reduction furnace between 250° C. and 400° C. by adjusting temperature of the heat supply source.

Figure 3:
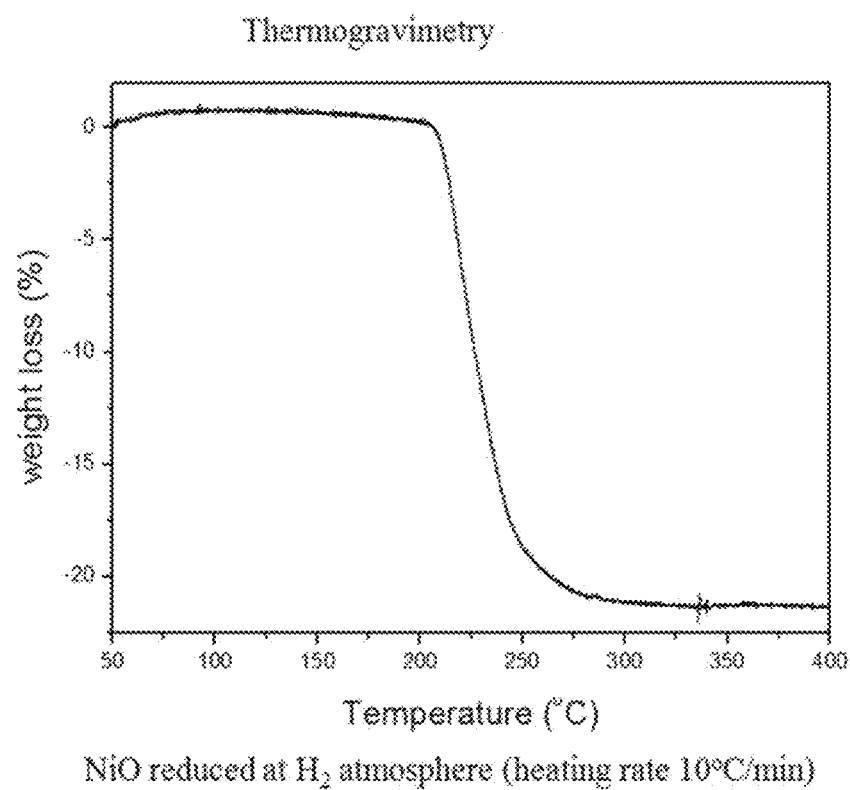
FIG. 3 is a thermogravimetric analysis graph showing an extent that weight of NiO is decreased by water vaporization of oxygen while temperature is being increased in a hydrogen reduction process.

FIG. 3 is a thermogravimetric analysis graph showing an extent that weight of NiO is decreased by water vaporization of oxygen while temperature is being increased in a hydrogen reduction process.

As illustrated, it can be confirmed that weight is reduced near 200° C. after maintaining a constant weight of NiO while temperature is gradually being increased, while weight of NiO is not reduced any more within a temperature range of 250 to 400° C.

That is, an optimal natural nickel metal can be prepared by the hydrogen reduction process within this temperature range, and the present invention is also characterized by performing the hydrogen reduction process within the temperature range.

Meanwhile, since a so-called "neck" phenomenon of sticking up to nickel metal during the foregoing process may be generated, a so-called crushing process is performed to prevent generation of the "neck" phenomenon.

Preferably, the crushing process is performed at a rotation speed of 1,000 to 4,000 rpm for 1 to 5 hours using beads with a diameter of 0.3 to 3.0 mm as a crushing medium.

Figure 4:
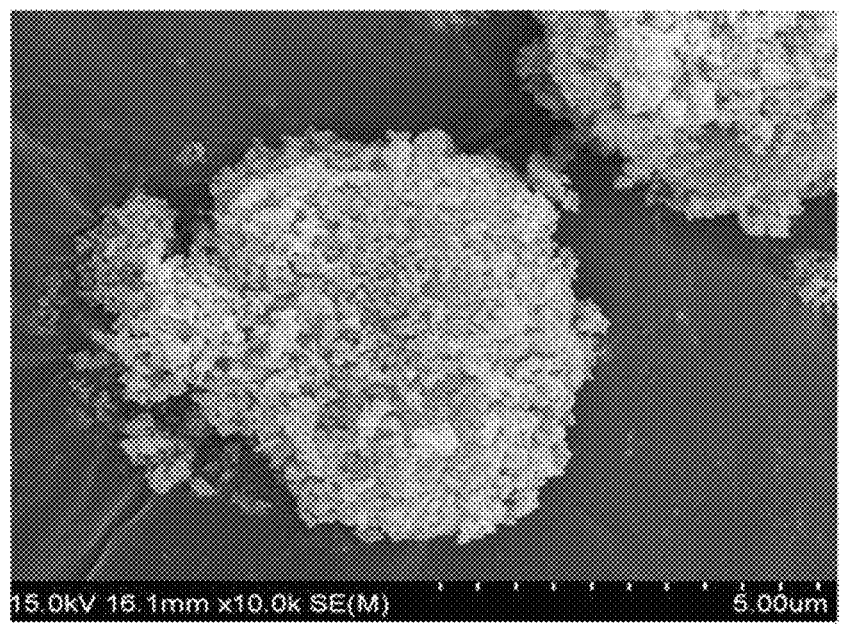
FIG. 4 is a scanning electron microscope (SEM) analysis graph showing nanonickel that has not passed through the crushing step.
Figure 5:
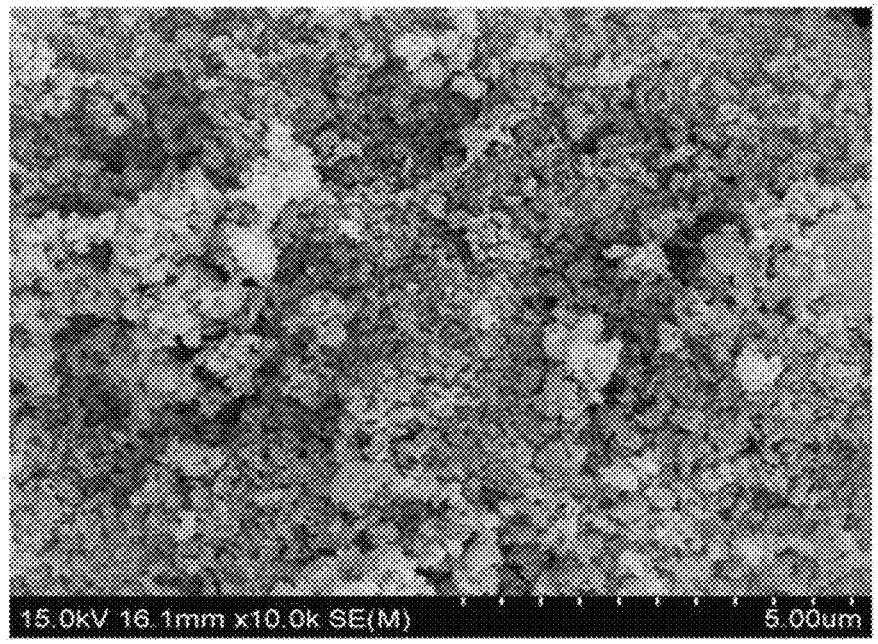
FIG. 5 is an SEM analysis graph showing nanonickel that has passed through the crushing step.
Figure 6:
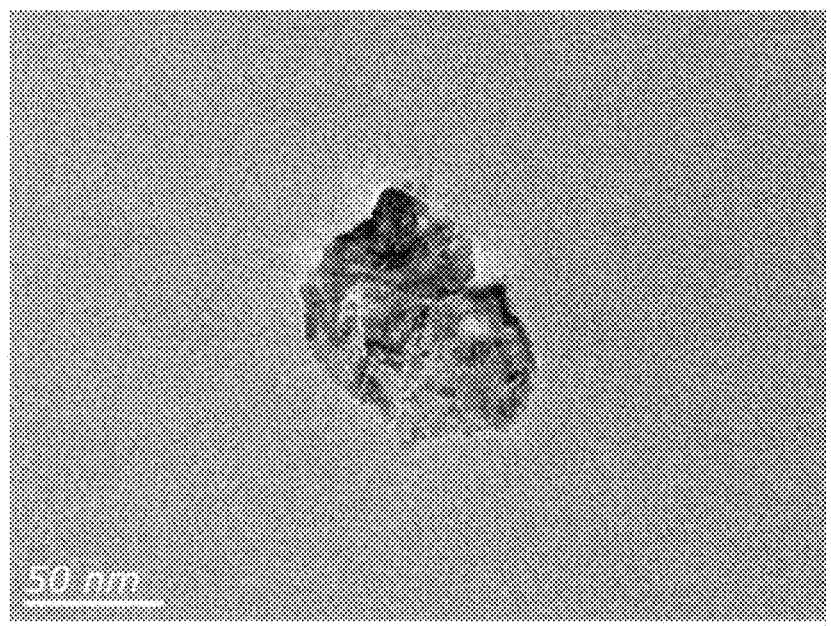
FIG. 6 is a transmission electron microscope (TEM) analysis graph showing nanonickel realized by the present invention.

For reference, FIG. 4 is a scanning electron microscope (SEM) analysis graph showing nanonickel that has not passed through the crushing step, FIG. 5 is an SEM analysis graph showing nanonickel that has passed through the crushing step, and FIG. 6 is a transmission electron microscope (TEM) analysis graph showing nanonickel realized by the present invention.

At this time, the method according to the present invention includes performing a crushing process and a nanopowder oxidation preventing coating step of forming an oxidation preventing film on a crushed natural metal nickel nanopowder at the same time.

Namely, an oxidation preventing film is formed on the crushed natural metal nickel nanopowder with an additive, the additive may be included of any one selected from triethanolamine (TEA) and oleic acid, and the additive is added in a powder rate of 0.05 to 3.0 wt %.

Since nickel natural metal can be easily oxidized in a nanopowder state, the method according to the present invention includes coating the oxidation preventing film on the surface of the nanopowder to prevent oxidation of the nickel natural metal.

Meanwhile, it is still apprehended that the nanopowder may be corroded by contact with air although the step of coating the oxidation preventing film on the surface of the nanopowder is performed, and the method according to the present invention further includes performing a process of making the nickel nanopowder into a paste to provide easiness in storage and transport.

Namely, a method for forming a so-called cake from the paste by making the nickel nanopowder into a paste includes performing a vacuum stirring process of stirring any one selected from methanol, ethanol, methyl ethyl ketone, toluene, ethyl acetate, and wax along with the nickel nanopowder in a vacuum state, and performing a vacuum defoaming process at a rotation speed of 500 to 1,500 rpm for 30 to 90 minutes.

To this end, the method includes a process of making the nickel nanopowder into a paste by performing the vacuum stirring and defoaming processes, and equipment used in the method may include 'planetary mixer', 'basket mill', 'homo mixer', etc.

The solvent may include the above-mentioned materials, contact of the nickel oxide nanopowder with air is blocked by the solvent, and easiness in storage and transport is provided by making the nickel oxide nanopowder into a paste during storage and transport.

Figure 7:
FIG. 7 is a photograph showing a paste realized by the present invention.

For reference, FIG. 7 is a photograph showing a paste realized by the present invention.

The scope of the present invention is not limited to the above embodiments but defined by the appended claims, and it is apparent that various changes and modifications can be made within the scope of the present invention defined in the appended claims by those having ordinary skill in the art.

The invention claimed is:

1. A method for making a nickel nanopowder into a paste, the method comprising:
   (a) a step of preparing a nickel oxide configured in the form of an oxide;
   (b) a nickel oxide nanopowder preparation step of pulverizing the nickel oxide to prepare a nano-sized nickel oxide nanopowder;
   (c) a step of drying the nickel oxide nanopowder;
   (d) a step of preparing the nickel oxide nanopowder into a natural metal nickel nanopowder by a reduction process in a hydrogen atmosphere and heat-treating the nickel oxide nanopowder at the same time to prepare the natural metal nickel nanopowder;
   (e) a step of simultaneously performing a step of crushing the natural metal nickel nanopowder produced by the heat-treatment process and a nanopowder oxidation preventing coating step of forming an oxidation preventing film on the crushed natural metal nickel nanopowder with an additive; and
   (f) a step of making the natural metal nickel nanopowder which has been formed by simultaneously performing the crushing step and the coating step into the paste.

2. The method of claim 1, wherein the step (b) includes preparing a nano-sized nickel oxide nanopowder by milling the nickel oxide by a rotating mill using a pulverizing medium.

3. The method of claim 2, wherein the nickel oxide nanopowder is made into the paste by pulverizing the nickel oxide at a rotation speed of 1,000 to 4,000 rpm for 10 to 30 hours by using beads with a diameter of 0.3 to 3.0 mm as the pulverizing medium and using methanol or ethanol as a solvent.

4. The method of claim 1, wherein the reduction process in the hydrogen atmosphere is performed at a hydrogen injection flow rate of 2.5 to 7.0 L/min and a temperature of 250° C. and 400° C. for a process time of 0.5 to 5.0 hr.

5. The method of claim 1, wherein the step (e) includes performing the crushing process at a rotation speed of 1,000 to 4,000 rpm for 1 to 5 hours using beads with a diameter of 0.3 to 3.0 mm as a crushing medium.

6. The method of claim 1, wherein the step (e) includes forming an oxidation preventing film on the crushed natural metal nickel nanopowder with an additive, and the additive is triethanolamine (TEA).

* * * * *